United States Patent [19]

Miyako

[11] Patent Number: 4,477,889
[45] Date of Patent: Oct. 16, 1984

[54] RECORDING MEDIA SELECTING MECHANISM

[75] Inventor: Haruyoshi Miyako, Nagano, Japan

[73] Assignee: Kabushiki Kaisha Sankyo Seiki Seisakusho, Nagano, Japan

[21] Appl. No.: 458,801

[22] Filed: Jan. 18, 1983

[30] Foreign Application Priority Data

Jan. 18, 1982 [JP] Japan .................................. 57-4856

[51] Int. Cl.³ ...................... G11B 17/22; G11B 23/00; G11B 5/012; G11B 5/016
[52] U.S. Cl. .................................... 369/35; 369/258; 360/98; 360/99
[58] Field of Search ............................ 360/71, 97–99, 360/132–133, 135, 86; 369/258, 35, 199

[56] References Cited

U.S. PATENT DOCUMENTS

| 4,151,572 | 4/1979 | Yamamoto et al. | 360/132 X |
| 4,167,029 | 9/1979 | Ragle et al. | 360/133 X |
| 4,330,803 | 5/1982 | Karol | 360/133 X |

*Primary Examiner*—Aristotelis M. Psitos
*Assistant Examiner*—Steven R. Garland
*Attorney, Agent, or Firm*—Sughrue, Mion, Zinn, Macpeak and Seas

[57] ABSTRACT

A recording media selecting mechanism has a recording media selecting knob which is sufficiently large so that the recording media selecting operation can be easily performed. A starting member or, alternatively, a driving source is utilized to actuate automatically a lifting operation of recording media sheets which are contained in a recording media package so that the recording media sheets are not required to be lifted using a manual lever.

11 Claims, 10 Drawing Figures

RECORDING MEDIA SELECTING MECHANISM

BACKGROUND OF THE INVENTION

1. Field of the Invention

The present invention relates to a recording media selecting mechanism for a recording/reproducing apparatus in which a signal converting element traces a recording medium in a package so that it records/reproduces a signal onto or out of the recording medium.

2. Description of the Prior Art

Japanese Patent Application Laid-Open No. 123203/77 discloses a recording/reproducing apparatus in which interlocked upper and lower halves of a recording media package are released when the package is set in the recording/reproducing apparatus. In addition, separator/selector rods are lifted up in accordance with a pregiven selecting condition so that one of a plurality of recording media which are accommodated in the package is selected so that recording or reproducing can be performed. The recording media located under the selected recording medium are then left in the lower half of the package. The remaining recording media which are located above the selected recording medium are lifted upwards, together with the upper half of the package, and a tone-arm which contains a signal conversion element is set on the uppermost recording medium left in the lower half of the package 3 (the selected recording medium) so that signal recording or reproducing may be performed.

In such a conventional apparatus, however, the selection of a desired recording medium is effected on a rotary board, and a knob for recording the medium selection can not be larger than the diameter of a central hole of the recording media. Accordingly, it is difficult to effect the selecting operation. In addition, it is necessary to raise a recording media lift-up member manually after the recording media selection has been performed, and it is difficult, in view of the structure, to raise the recording media lift-up member by any driving source other than a manual driving source.

SUMMARY OF THE INVENTION

An object of the present invention is to provide a recording media selecting mechanism which contains a recording media selecting knob which is sufficiently large so that the recording media selecting operation can be easily performed, and in which it is possible to perform the operation of raising the recording media lift-up member by linking it with the operation of a starting member or by a driving source so that the lifting of the recording media does not have to be performed using a manual means.

DESCRIPTION OF THE PREFERRED EMBODIMENTS

Figure 1:
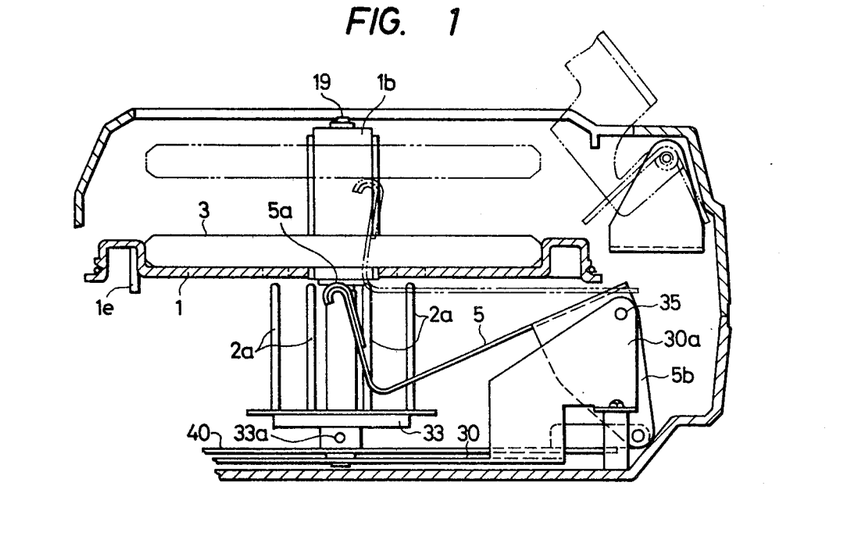
FIG. 1 is a longitudinal, cross-sectional view illustrating an embodiment of the present invention.
Figure 2:
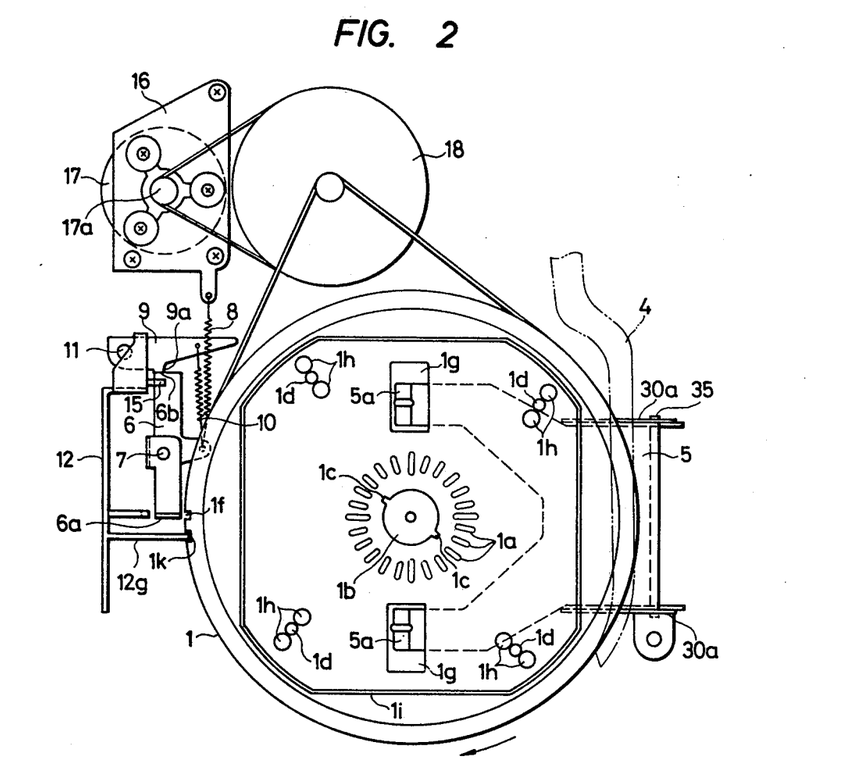
FIG. 2 is a plan view of the embodiment of FIG. 1.
Figure 3:
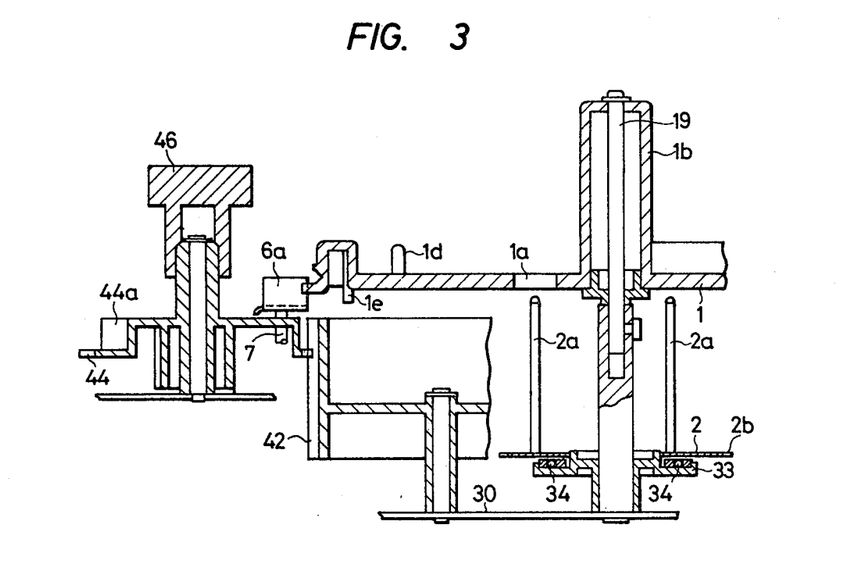
FIG. 3 is a longitudinal cross-sectional view illustrating an embodiment of a part of a recording media selecting mechanism used in the above-mentioned embodiment.

In FIGS. 1 and 2, a motor 17 is supported by a base plate 16 which is fixedly attached to a predetermined immovable part so that a rotating force of a pulley 17a, which is mounted on a rotary shaft of the motor so that it projects from the base plate 16, is transmitted through a belt to a flywheel 18. The rotating force of the flywheel 18 is further transmitted through another belt to a rotary board 1 to rotate the rotary board 1 in a clockwise direction, as viewed in FIG. 2. As also shown in FIG. 3, a hollow guide shaft portion 1b of the rotary board 1 is rotatably supported on a supporting axis 19 which projects from an immovable base plate 30. At positions close to the guide shaft portion 1b, a number of elongated holes 1a, as best seen in FIG. 2, are coaxially formed so that four recording media selecting rods 2a can pass through the holes 1a. The above-mentioned guide shaft portion 1b of the rotary board 1 passes through a recording media package 3 to support the package 3, and two axially extending ribs 1c are formed on the outer circumferential surface of the guide shaft portion 1b. Four pins 1d are formed on the upper surface of the rotary board 1, and, when the recording media package 3 is placed on the rotary board 1, the pins 1d fit into mating holes which are formed at four corners of the package 3 to enable the package 3 to be separated into upper and lower parts. A sensor pin 1e is formed at an outer peripheral portion on the lower surface of the rotary board 1, and the sensor pin is adapted to actuate a tone-arm 4. Further, a lock slot 1f, which constitutes part of a main stop means for stopping the rotary board 1 at a predetermined position, is formed at an outer peripheral portion of the rotary board 1. An auxiliary slot 1k, which constitutes part of an auxiliary means for stopping the rotary board 1 at the predetermined position, is formed at an outer periphery of the rotary board 1. Two windows 1g are formed in the rotary board 1 at positions which are symmetrically disposed about the shaft portion 1b and which are closer to the circumferential periphery of the rotary board 1 than the above-mentioned elongated holes 1a. Arm end portions 5a of a forked actuator member 5, which are capable of taking out the package 3, may enter the windows 1g. Two small holes 1h are located adjacent to each of the four pins 1d so that eight holes 1h are provided. Fitting portions 1i are formed on the upper surface of the rotary board 1, and the fitting portions 1i fit into the outer circumferential figure of the recording media package 3 so that the rotary board can fittingly accommodate the package 3 within it.

A lock plate 6 is located in the vicinity of the side of the rotary board 1, and the lock plate 6 contains an engaging portion 6a for engaging the above-mentioned lock slot 1f. Accordingly, the lock plate 6 and the engaging portion 6a constitute a part of the stopper means, and both the lock plate 6 and the engaging portion 6a are rotatably supported about an axis 7 and in a horizontal plane. The lock plate 6 is rotatably biased in the counterclockwise direction by a spring 8, as shown in FIG. 2. The lock plate 6 has an end portion 6b which is located at the opposite side of the engaging portion 6a, and this serves as another engaging portion for engaging a shoulder portion 9a of an engaging lever 9. The lever 9 is biased by a spring 10 to be rotatable about an axis 11 in the clockwise direction in FIG. 2 so that the engaging lever 9 and the lock plate 6 pull each other.

Figure 4:
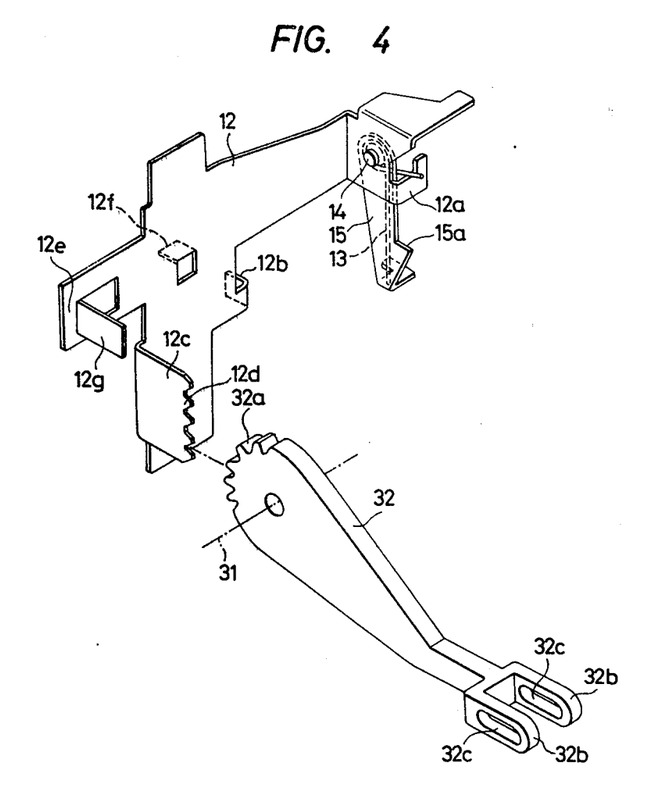
FIG. 4 is a perspective view illustrating a part of the embodiment relating to a starting plate.
Figure 7:
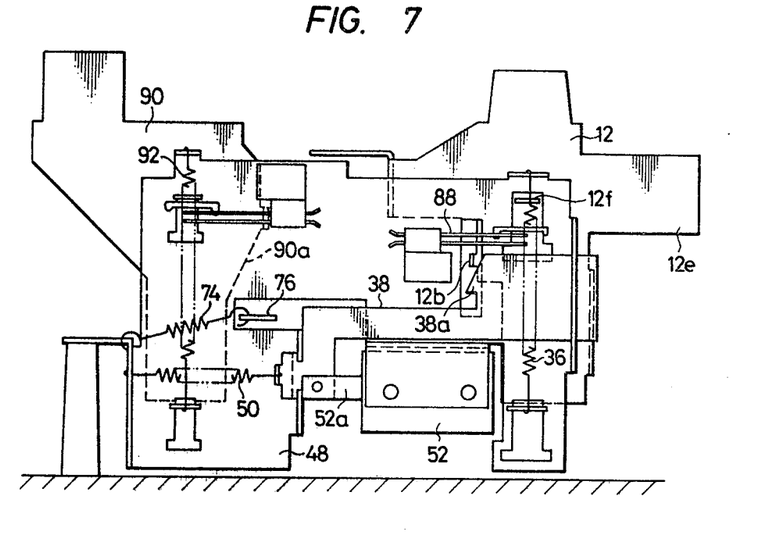
FIG. 7 is a front view of an actuator portion of the FIG. 6 embodiment.
Figure 8:
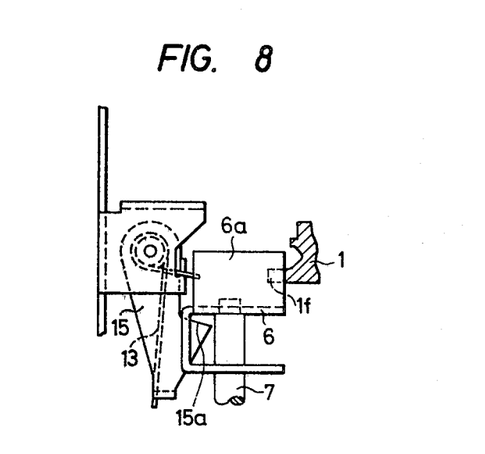
FIG. 8 is a side view illustrating part of the embodiment relating to the starting plate.

Referring to FIGS. 2 and 4, an engaging plate 15, which is located on a slant above the lock plate 6, is vertically supported by a starting plate 12 so that it rotates about an axis 14 and in a plane perpendicular to the plane in which the lock plate 6 rotates. The engaging plate 15 has a shoulder engaging portion 15a at its lower portion, and it is biased by a spring 13 in the counterclockwise direction, as viewed in FIG. 4, with a positional limitation at which it abuts against a bent portion 12a of the starting plate 12. The starting plate 12 is vertically slidable by guide means (not shown) so that the engaging plate 15 can also slide vertically as the starting plate 12 moves, and the starting plate 12 is biased upward by a spring 36 (see FIG. 7). The starting plate 12 has another bent portion 12b so that, when the starting plate 12 is moved downward against the upward biasing force, the bent portion 12b is engaged by a hook portion 38a of an engaging member 38, as shown in FIG. 7, so that it prevents the starting plate 12 from moving further downward, while the starting plate 12 may move further downward if the hook portion 38a is disengaged. The starting plate 12 has a further bent portion 12c which is provided at its end with a rack 12d, and the rack 12d, in turn, gears with a partial gear portion 32a of a selector plate driving lever 32. The selector plate driving lever 32 is rotatably supported in a vertical plane about an axis 31.

The lever 32 contains at its forward end a pair of fork portions 32b which are, respectively, provided with elongated holes 32c. A pin 33a is loosely inserted into each of the elongated holes 32c (see FIG. 1), and the pin 33a is formed on a selector plate supporter 33 which is movable vertically along the above-mentioned axis 19. Accordingly, the downward force of the starting plate 12 is transmitted to the lever 32 via the rack 12d and the partial gear portion 32a, thus causing the lever 32 to pivot. The pivot motion is further transmitted from the lever 32 to the selector plate supporter 33 as an upward moving force. A selector plate 2 (FIG. 3) is supported on the selector plate supporter 33 through ball bearings 34 so that it is rotatable about the axis 19, and the above-mentioned selecting rods 2a are fixedly provided on the selector plate 2.

An auxiliary stop member 12g extending from the starting plate 12 is engaged with the auxiliary slot 1k formed in the periphery of the rotary board 1. The auxiliary stop member 12g is moved downward together with the starting plate 12 to disengage from the auxiliary slot 1k. The auxiliary stop means is formed for the purpose of ensuring the engagement of the main stop member and preventing the startup operation of the start switch if the engagement of the main stop means is insufficient.

Figure 5:
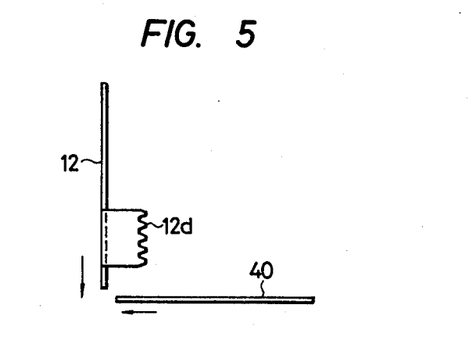
FIG. 5 is a side view illustrating the relation between the starting plate and an actuator member.

A package removing actuator member 5 has a base portion which is rotatably supported in a vertical plane and about an axis 35 which is provided on a pair of upright portions 30a of the fixed base plate 30. One of the opposite arms of the actuator member 5 is forked and bent upward to form two fork portions 5a which may be, respectively, inserted through the windows 1g of the rotary board 1. The other arm 5b of the actuator member 5 extends downward and is pivotally supported at its end at an end portion of an ejector member 40, which is slidable along the base plate 30. Accordingly, as the ejector member 40 moves longitudinally, the actuator member 5 swings vertically about the axis 35. As shown in FIG. 5, however, if the starting plate 12 is pushed down, a part of the plate 12 projects in the travelling path of the ejector member 40 and prevents the actuator member 5 from rotating upward.

The above-mentioned recording media package 3 is basically arranged in the same manner as that disclosed in the above-mentioned Japanese Patent Application Laid-Open No. 12302/77. When the four selecting rods 2a move upward, they pass through the holes 1a of the rotary board 1 and the holes in the lower half of the package 3 so that they lift up a desired number of uppermost recording media sheets, together with the upper half of the package 3, in accordance with the positions of the selecting rods 2a and the overlapping state of the respective recording media sheets. The tone-arm 4, which will be described later, then comes down onto a desired uppermost recording medium sheet which remains on the rotary board 1.

Figure 9:
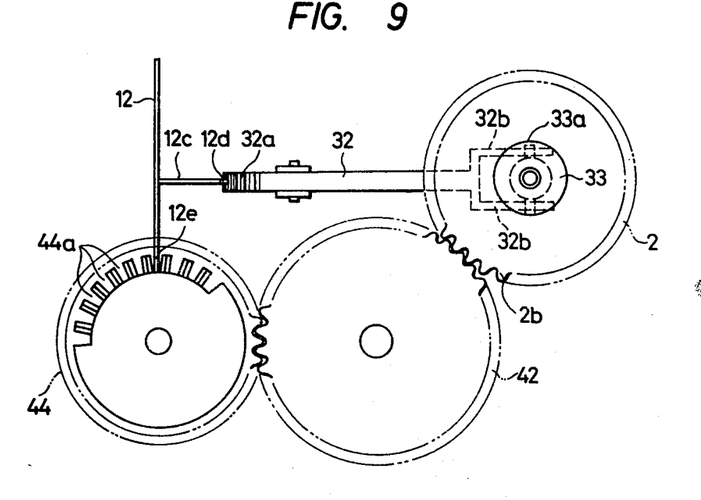
FIG. 9 is a plan view of the selecting mechanism portion.
Figure 10:
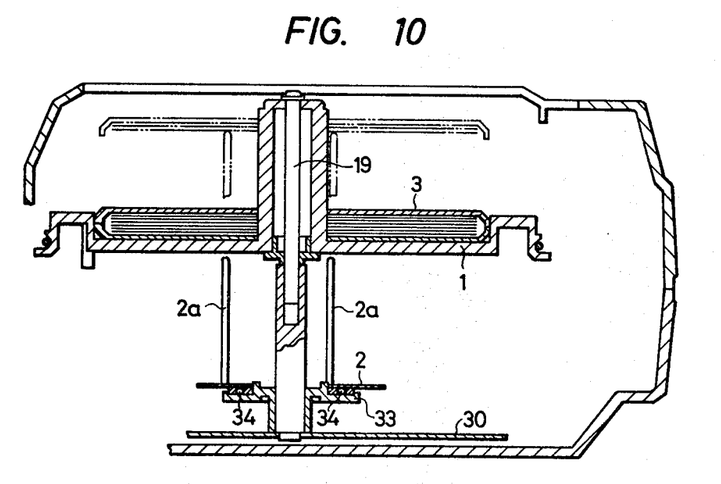
FIG. 10 is a longitudinal cross-section illustrating a part of the above-mentioned selecting mechanism portion, the recording media package and a part of the rotary board.

The mechanism for selecting recording media by the above-mentioned selecting rods 2a is arranged as shown in FIGS. 3, 9 and 10. In these figures, the selector plate 2 is provided at its circumferential periphery with a gear portion 2b which engages with an idle gear 42. The idle gear 42 is elongated in a thrust direction so that the selector plate 2 can move vertically with its gear portion 2b engaged with the idle gear 42. The idle gear 42 engages with a driving gear 44 and the gear 44 can be rotated by an actuating knob 46. The gear 44 contains an appropriate number of slots 44a which are equidistantly formed at its circumferential upper periphery so that, when the starting plate 12 is pushed down, an end portion 12e of the starting plate 12 enters one of the slots 44a thereby to prevent the gear 44 from being rotated. The gear 44 is arranged so that it may be click-stopped by a click mechanism (not shown) at every rotary angle corresponding to the intervals of the slots 44a. Since the recording media selecting mechanism is arranged as mentioned above, if the knob 46 is rotated, the rotary force of the knob 46 is transmitted to the starting plate 12 through the gear 42 and the gear portion 2b so that it places the selector plate 2 and the selecting rods 2a at their predetermined rotary positions. Then, the starting plate 12 is pushed down to select the recording media. After the starting plate has been pushed down, the gear 44 is prevented from rotating so that it disables the recording media selecting operation. Further, the gear portion 2b of the selector plate 2 engages with the gear 42, at least until the selecting rods 2a of the selector plate 2 have passed through the holes 1a of the rotary board 1, while the gear portion 2b can be made to disengage the gear 42 after the selecting rods 2a have passed through the holes 1a.

In FIG. 7, the above-mentioned engaging member 38 is movably supported in the horizontal direction by a supporting plate 48. The supporting plate 48 rises vertically from the body of the apparatus, and it is normally biased leftward in FIG. 7 by a spring 50 so that the shoulder engaging portion 38a projects in the travelling path of the bend portion 12b of the start plate 12. The engaging member 38 is connected to a plunger 52a of a solenoid 52 so that the engaging member 38 moves rightward in FIG. 7 against the biasing force of the spring 50 when the solenoid 52 is energized.

Figure 6:
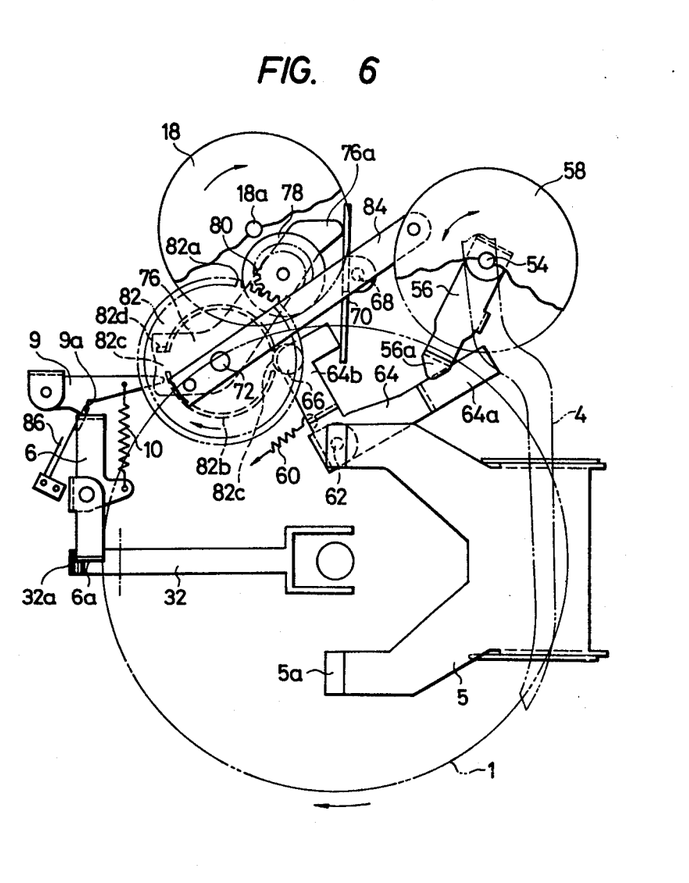
FIG. 6 is a plan view illustrating the main part of the embodiment of the present invention.

As shown in FIG. 6, a sensor lever 56 is rotatably mounted on a rotary shaft 54 of the tone-arm 4 and has a forward bent portion 56a which is located on the travelling path of the sensor pin 1e of the rotary board 1. The tone-arm 4 rotates until it stops above the recording media on the rotary board 1. It then loweres itself onto the recording media, rises up from the recording media, and comes back to its original position, in accordance with the reciprocating rotation of a rotary plate 58. A tone-arm moving mechanism responsive to the rotation of the rotary plate 58 is disclosed in Japanese Utility Model Application Nos. 61132/81 and 63868/81, which were filed by the same applicant as the present application. A spring (not shown) is provided between the above-mentioned sensor lever 56 and the rotary plate 58 so that, when the rotary plate 58 is rotated counterclockwise, the sensor lever 56 is also rotated by the biasing force of the above-mentioned spring (not shown). The bend portion 56a then projects into the travelling path of the sensor pin 1e, as described above and as shown in FIG. 6. When the rotary plate 58 is rotated clockwise, the sensor lever 56 is also rotated clockwise by the biasing force of the spring so that the bend portion 56a comes out of the travelling path of the sensor pin 1e. One arm 64a of a bell-crank lever 64, which is rotatably biased counterclockwise about an axis 62 by a spring 60, abuts against the bend portion 56a of the sensor lever 56. A roller 66 is provided at the other arm 64b of the lever 64, and an end of the arm 64b abuts against one arm of a plate spring 70 which is supported rotatably about an axis 68. One arm end portion 76a of a lever 76, which is biased clockwise in FIG. 6 by a spring 74 (see FIG. 7), abuts against the other arm of the plate spring 70. The lever 76 contains a pinch roller 78 and a gear 80 which are integrally formed and rotatably supported with each other. When the lever 76 is rotated counterclockwise, the pinch roller 78 abuts against the shaft 18a of the flywheel 18, and the rotary force of the flywheel 18 is transmitted to the pinch roller 78. The gear 80 then engages with a gear 82a of a rotary body 82 which is rotatably mounted on the axis 72. The rotary body 82 has a circumferential well 82b at its lower side, and the wall 82b is formed with a pair of slots 82c at symmetrical positions relative to each other with respect to the axis 72. The rotary body 82 also has a protrusion 82d, and the forward end of the above-mentioned engaging lever 9 projects into the travelling path of this protrusion 82d. The rotary body 82 and the above-mentioned rotary plate 58 are connected by a rod 84 and constitute a part of movement conversion means so that the rotary plate 58 performs one reciprocating movement every time the rotary body 82 makes a half revolution. As shown in the drawing, the roller 66 of the lever 64 normally falls in one of the slots 82c, and the lever 64 rotates counterclockwise so that the plate spring is not energized, thereby allowing the pinch roller 78 to disengage from the shaft 18a to prevent the rotary force of the flywheel 18 from being transmitted to the pinch roller 78. A movable contact of a switch 86 abuts against an end portion of the lock plate 6 so that, when the lock plate 6 rotates counterclockwise, the switch 86 is turned on so that the above-mentioned solenoid is energized.

In FIG. 7, a switch 88, for supplying power to the above-mentioned motor 17, is located on the supporting plate 48. A movable contact of the switch 88 extends into the traveling path of a bend portion 12f of the starting plate 12 so that, when the starting plate 12 is pushed down, the moving contact of the switch 88 is pushed by the bend portion 12f to activate the switch 88. A stopper plate 90 is moveable vertically on the supporting plate 48 and is biased upward by a spring 92. The stopper plate 90 has an oblique edge portion 90a so that, when the stopper plate 90 is pushed down, one arm of the above-mentioned lever 76 is pushed to cause the lever 76 to rotate.

Next, the operation of the above-mentioned embodiment will be described.

After a given recording media package 3 has been set on the rotary board 1, as shown by a solid line in FIG. 1, the knob 46 in FIG. 3 is rotated to its rotary position corresponding to a desired recording media contained in the package 3. As described above, the positions of the four selecting rods 2a are determined in accordance with the rotary position of the knob 46. Next, the starting plate 12 is pushed down so that it is engaged with the shoulder engaging portion of the engaging member 38 and prevented from moving upward. Then, the lock plate 6 is pushed by the oblique edge portion which follows the shoulder engaging portion 15a of the engaging plate 15. The engaging plate 15 moves downward, together with the starting plate 12, and the lock plate 6 is rotated in the clockwise direction in FIG. 2 so that the engaging portion 6b engages the shoulder engaging portion 9a of the engaging lever 9. Accordingly, although the shoulder engaging portion 15a of the engaging plate 15 moves to a position under the lock plate 6, the lock plate 6 is prevented from returning back to its original position. Upon the rotation of the lock plate 6, the bend portion 6a, which was engaged with the lock slot 1f of the rotary board 1, comes out of the slot 1f so that the rotary board 1 can rotate. In this case, it is noted that the auxiliary stop means including the slot 1k and the member 12g is first released by the downward movement of the starting plate 12.

Furthermore, when the starting plate 12 is pushed down, the selector plate driving lever 32 is rotated counterclockwise in FIG. 4, as described above, and the selector plate supporter 33, the selector plate 2 and the selecting rods 2a are pushed up so that a desired recording media accommodated in the package 3, and those located underneath it, are left as they are, together with the lower half of the package 3. The remaining recording media, which are located above the desired recording media are pushed up, together with the upper half of the package 3, by the four selecting rods 2a, as shown by a dotted line in FIG. 10, in accordance with the condition set by the above-mentioned knob 46. At this time, the selector plate 2 is positioned above the idle gear 42 so that the gear portion 2b is disengaged from the gear 42. Further, at this time, the end portion 12e of the starting plate 12 falls into one of the slots 44a of the driving gear 44 so that it disables the rotation of the gear 44.

In addition, when the starting plate 12 is pushed down, the switch 88 is activated to start the motor 17 so that the rotary board 1 is driven via the flywheel 18 to rotate in the clockwise direction shown in FIG. 6. Within the first revolution of the rotary board 1, the sensor pin 1e of the rotary board 1 pushes the bend portion 56a of the lever 56, thus causing the lever 56 to rotate in the counterclockwise direction. The lever 56 pushes the arm 64a of the lever 64, thus causing the lever 64 to rotate in the clockwise direction. When the lever 64 rotates, the roller 66 comes out of the slot 82c of the rotary body 82 and, at the same time, the lever 64 pushes an arm of the plate spring 70, thus causing it to rotate in the counterclockwise direction so that it pushes the lever 76. The lever 76 is thereby caused to rotate against a biasing force so that the pinch roller 78 is pressed to the shaft 18a of the flywheel 18. Accordingly, the rotary force of the shaft 18a is transmitted to the rotary body 82 through the pinch roller 78, the gear 80, and the gear 82a, so that it rotates the rotary body 82 in the clockwise direction. Although the pushing force of the sensor pin 1e which is applied to the lever 56 is released when the rotary board further rotates, if the rotary body 82 rotates even a little in the manner described above, the roller 66 abuts against the circumferential wall 82a of the rotary body 82 so that the lever 64 is prevented from rotating, thus allowing the rotary board 82 to continue its rotation.

Therefore, the rotation of the rotary body 82 causes the rotary plate 58 to rotate in the clockwise direction so that the tone-arm 4 is rotated by an appropriate arm controlling mechanism (not shown). The tone-arm then comes onto the above-mentioned recording media to initiate the recording/reproducing operation. When the rotary plate 58 rotates in the clockwise direction, a spring (not shown) is energized which causes the sensor lever 56 to rotate in the clockwise direction so that the bend portion 56a of the lever 56 comes out of the travelling path of the sensor pin 1e.

When the rotary body 82 has rotated by a half revolution from the state of FIG. 6, the roller 66 engages one of the slots 82c. The lever 64, the plate spring 70 and the lever 76 then rotate in the counterclockwise, clockwise and clockwise directions, respectively, so that the pinch roller 78 disengages from the shaft 18a, and the rotation of the gear 80 and the rotary body 82 is stopped. Since the rotary board 1 is driven to continue to rotate, however, the recording/reproducing operation is continued. At this time, the selector plate 2 rotates on the ball bearings 34, together with the selector rods 2a, rotary board 1 and package 3.

When the recording/reproducing operation is stopped, the stopper plate 90 (see FIG. 7) is pushed down, and its oblique edge portion 90a pushes an arm of the lever 76 to rotate it in the counterclockwise direction in FIG. 6 so that the pinch roller 78 is pressed against the shaft 18a to rotate the rotary body 82 in the clockwise direction in FIG. 6. If the rotary body 82 rotates even a little, the roller 66 is caused to disengage from the slot 82c and abut against the circumferential wall 82b so that the lever 64, the plate spring 70 and the lever 76 are held in their rotated state in the clockwise, counterclockwise and counterclockwise directions, respectively, to continue the above-mentioned driving of rotation of the rotary body 82. The above-mentioned rotation of the rotary body 82 causes the rotary plate 58, through the rod 84, to rotate in the counterclockwise direction so that the tone-arm 4 is lifted up from the recording media and then rotated in the counterclockwise direction to return to its original position. Immediately before the rotary body 82 has returned to its original position after its further half revolution, the protrusion 82d pushes the forward end of the lever 9 to cause it to rotate in the counterclockwise direction in FIG. 6 so that it disengages the engagement between the shoulder engaging portion 9a and the lock plate 6, thus enabling the lock plate 6 to rotate in the counterclockwise direction. However, the bent portion 6a of the lock plate 6 abuts against the circumferential wall of the rotary board 1 and, therefore, the lock plate 6 can barely rotate. Then, when the rotary board 1 rotates so that the lock slot 1f of the rotary board 1 comes to the position of the bend portion 6a of the lock plate 6, the bend portion 6a of the lock plate 6 falls into the slot 1f, and the lock plate 6 rotates in the counterclockwise direction in FIG. 6 to prevent the rotation of the rotary board 1. At the same time, the lock plate 6 activates the switch 86 to energize the solenoid 52. Thus, the engaging member 38 is pulled to the right in FIG. 7, through the plunger 52a, so that it disengages the engagement between the hook portions 28a and the bend portion 12b of the starting plate 12, thus causing the starting plate 12 to return to its original position so that the switch 88 is turned off and the motor 17 is deenergized. The switch 88 serves as a main switch and, therefore, although the switch 86 is activated at this time, the main circuit is cut off and the solenoid is not actuated. Thus, when the starting plate 12 has returned to its original position, the selector plate driving lever 32, the selector plate 2 and the selecting rods 2a also return to their original positions, while the package 3 and the recording media also return to their original states so that the upper and lower halves of the package 3 are integrated with each other with all the recording media stacked and accommodated within the integrated package 3.

When the package 3 is removed after the recording/reproducing operation has been completed, an ejector button (not shown) is actuated to move the ejector member 40 leftward in FIG. 1, thus causing the actuator member 5 to rotate, as shown by a dotted line in FIG. 1, to push up the package 3 along the axis 1b. In this manner, the package can be easily removed by the ejecting operation described above.

In this manner, according to the present invention, since the position of the recording media selector plate is set by rotating the selector plate through a gear train by actuating the selector means, it is possible to make the recording selecting knob sufficiently large to facilitate the recording media selecting operation. Further, since the system for the recording media selecting operation and the system for the recording media lifting operation are separated from each other, it is possible to lift up the recording media by linking it with the operation of the starting member or, alternatively, by means of any driving source other than a manual means.

Although it is shown that the selector plate 2 is thin and the gear 42 is elongated in the thrust direction in the illustrated embodiment, the selector plate 2 may be, alternatively, elongated in the thrust direction, and the gear 42 may be made thin. Further, the recording medium used in the apparatus according to the present invention may be a conventional, widely-used record board, a magnetic disc, an optical disc, or any other recording medium.

I claim:

1. A recording media selecting mechanism, comprising:
   a rotary board (1) rotatably supported about an vertical axis (19) and having a recording media mounting portion;
   means (17, 17a, 18) for rotating said rotary board;
   a vertically movable selector plate (2) having selector rods (2a) which pass through holes (1a) formed in said recording media mounting portion of said rotary board, a gear portion (2b) being formed at an outer circumferential periphery of said selector plate, said gear portion being rotatable coaxially with said rotary board;

rotatable recording media selector means (46);

a transmission gear (42) which is rotated by rotation of said rotatable recording media selector means, rotation of said transmission gear causing said selector plate to rotate;

one of either said selector plate and said transmission gear having increased thickness wherein said selector plate and said transmission gear are arranged such that they are engaged with each other as said selector plate moes vertically at least before said selector rods have passed through said holes of said rotary board and are not engaged with each other when said rotary board rotates.

2. The selecting mechanism as claimed in claim 1 wherein said rotary board rotating means comprises a motor (17) supported by a base plate (16), a pulley (17a) mounted on a rotary shaft of said motor, a flywheel (18) and a pair of belts for transmitting rotation of said pulley to said rotary board via said flywheel.

3. The selecting mechanism as claimed in claim 1 wherein said rotary board has a hollow guide shaft portion (1b) and is rotatably supported about said, shaft portion said recording media mounting portion holes being coaxially formed about said shaft portion, an outer circumferential portion of said shaft portion having ribs (1c), said rotary board having a plurality of pins (1d) for engaging corners of a recording media package (3) having upper and lower parts, said rotary board having a sensor pin (1e) for actuating a tone-arm (4), said rotary board also having a lock slot (1f) at an outer peripheral portion thereof which provides a means for preventing rotation of said rotary board, said rotary board having windows (1g) symmetrically disposed about said shaft portion; and further comprising a forked actuator member (5) having arm end portions (5a) movable through said windows.

4. The selecting mechanism as claimed in claim 3 wherein an upper surface of said rotary board has a fitting portion (1i) which mates with a correspondingly shaped portion of said recording media package.

5. The selecting mechanism as claimed in claim 1 further comprising an engaging lever (9) having a shoulder portion (9a);

a lock plate (6) having a first engaging portion (6a) which engages and disengages a lock slot (1f) formed on an outer periphery of said rotary board, said lock plate having a second engaging portion (6b) for engaging said shoulder portion of said engaging lever;

a first spring (8) for rotatably biasing said lock plate; and a second spring (10) for rotatably biasing said engaging lever.

6. The selecting mechanism as claimed in claim 5 further comprising an engaging plate (15) located slantwise above said lock plate and having a shoulder engaging portion (15a) at its lower portion;

a third spring (13) for rotatably biasing said engaging plate;

a vertically slidable starting plate (12) rotatably mounted in a plane which is substantially perpendicular to a plane in which said lock plate rotates;

a fourth spring (36) for biasing said starting plate upwards; and a second engaging member (38) having a hook portion (38a) which engages a first bent portion (12b) of said starting plate to prevent downward movement of said starting plate when said first bent portion and said hook portion are engaged.

7. The selecting mechanism as claimed in claim 6 further comprising a selector plate driving lever (32) having a gear portion (32a) which engages a rack (12d) of a second bent portion (12c) of said starting plate, said selector plate driving lever having a pair of forks (32b) at a forward end thereof.

8. The selecting mechanism as claimed in claim 1 further comprising a driving gear (44) connected to said rotatable recording media selector means, said driving gear being engaged with said transmission gear;

a movable starting plate (12), said starting plate having an end portion (12c) which enters one of a plurality of slots (44a) in said driving gear when said starting plate is pushed down to prevent said driving gear from rotating, rotation of said rotatable recording medium selecting means being transmitted to said selector plate via said driving gear when said starting plate is in an elevated orientation.

9. The selecting mechanism as claimed in claim 8 further comprising an engaging member (38) connected to a plunger (52a) of a solenoid (52), and a spring (50) for biasing said engaging member, said engaging member being movably supported by a supporting plate (48) and having a shoulder engaging portion (38a) which selectively engages a bend portion (12d) of said starting plate.

10. The selecting mechanism as claimed in claim 1 further comprising:

a sensor lever (56) rotatably mounted on a rotary shaft (54);

a rotary plate (58) connected to said sensor lever for rotating said sensor lever;

a rotatable bell crank lever (64);

a spring (60) for biasing said bell crank lever, said bell crank lever having an arm (64a) which abuts against a bend portion (56a) of said sensor lever and having a roller (66) providing on an additional arm (64b) which abuts against one arm of a plate spring (70).

11. The selecting mechanism as claimed in claim 3, wherein said rotary board has at its periphery an auxiliary stop slot (1k) for engaging with an auxiliary stop member (12g) thereby locking said rotary board a predetermined starting position.

* * * * *